United States Patent
Yu et al.

(10) Patent No.: US 8,756,797 B2
(45) Date of Patent: Jun. 24, 2014

(54) PRESSURE-SENSITIVE COVER INSTALLER

(75) Inventors: Chi-An Yu, Tu-Cheng (TW); Yan-Hao Li, Shenzhen (CN); Shi-Hong Lai, Shenzhen (CN); Zhi-Qiang Zhang, Shenzhen (CN)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 470 days.

(21) Appl. No.: 13/095,924

(22) Filed: Apr. 28, 2011

(65) Prior Publication Data

US 2012/0167379 A1    Jul. 5, 2012

(30) Foreign Application Priority Data

Dec. 29, 2010    (CN) .......................... 2010 1 0612226

(51) Int. Cl.
    *B23P 21/00*    (2006.01)
(52) U.S. Cl.
    USPC .............................. 29/714; 29/407.08; 29/831
(58) Field of Classification Search
    CPC .... B32B 2457/00; B32B 37/10; B32B 41/00; B23Q 1/70; B23P 21/00
    USPC ........... 29/709, 711, 713, 714, 715, 716, 717, 29/718, 719, 739, 740, 757, 753, 407.08, 29/831, 868, 854
    See application file for complete search history.

(56) References Cited

U.S. PATENT DOCUMENTS

| | | | | | |
|---|---|---|---|---|---|
| 3,704,502 | A | * | 12/1972 | Meyers et al. | 29/705 |
| 3,733,672 | A | * | 5/1973 | Bohannon et al. | 29/563 |
| 4,058,881 | A | * | 11/1977 | Gavin et al. | 29/715 |
| 4,510,683 | A | * | 4/1985 | Fedde et al. | 29/701 |
| 4,833,776 | A | * | 5/1989 | Wakamiya et al. | 29/837 |
| 5,357,668 | A | * | 10/1994 | Roberts | 29/559 |
| 6,076,254 | A | * | 6/2000 | Onodera et al. | 29/714 |
| 6,240,634 | B1 | * | 6/2001 | Kira et al. | 29/836 |
| 6,245,167 | B1 | * | 6/2001 | Stein | 156/64 |
| 6,289,256 | B1 | * | 9/2001 | Takeda et al. | 700/121 |
| 7,325,298 | B2 | * | 2/2008 | Kobayashi et al. | 29/740 |
| 7,364,633 | B2 | * | 4/2008 | Lim et al. | 156/64 |
| 8,424,194 | B2 | * | 4/2013 | Blumka et al. | 29/730 |

FOREIGN PATENT DOCUMENTS

CN    201283496 Y    *    8/2009

* cited by examiner

*Primary Examiner* — David Bryant
*Assistant Examiner* — Jacob Cigna
(74) *Attorney, Agent, or Firm* — Novak Druce Connolly Bove + Quigg LLP

(57) ABSTRACT

A pressure-sensitive cover installer includes a base, a fixing body defining a recessed portion for receiving a main body, a support portion, an air cylinder movably connected to the support portion, a positioning fixture defining a number of through holes therein, and for receiving a number of covers, a controller, a motor for controlling movement of the air cylinder, a pressure sensing member fixed below the air cylinder, and a display. The air cylinder is forced by the motor to drive the pressure sensing member to press the covers onto the main body; the main body resists the pressure sensing member to generate a pressure of a resistance. The pressure sensing member senses the pressure of the resistance to generate a pressure signal to the controller. The controller analyzes the pressure signal to generate a pressure value to be displayed on the display.

9 Claims, 5 Drawing Sheets

PRESSURE-SENSITIVE COVER INSTALLER

BACKGROUND

1. Technical Field

The present disclosure relates to assembly machines and, particularly, to an assembly machine that can install covers on electronic devices without applying too much pressure.

2. Description of Related Art

During assembly of covers onto a main body for some devices, the covers are often manually pressed onto the main body. During the manual operation, if too much pressure is used or if the pressure is applied unevenly, the main body and/or covers may be damaged.

Therefore, what is needed is a pressure-sensitive cover installer to overcome the described limitations.

DETAILED DESCRIPTION

Figure 1:
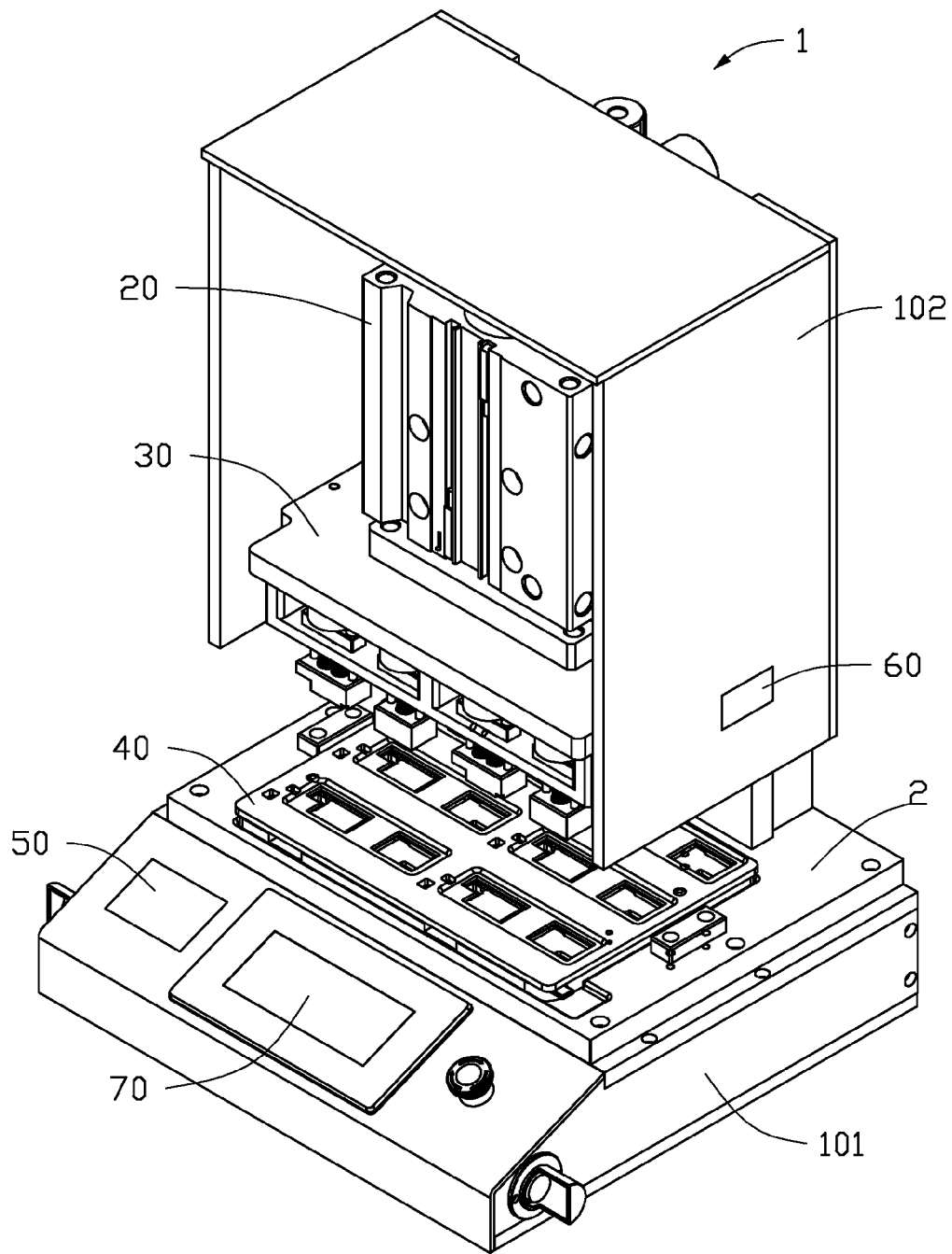
FIG. 1 is an isometric view of a pressure-sensitive cover installer in accordance with an exemplary embodiment.
Figure 2:
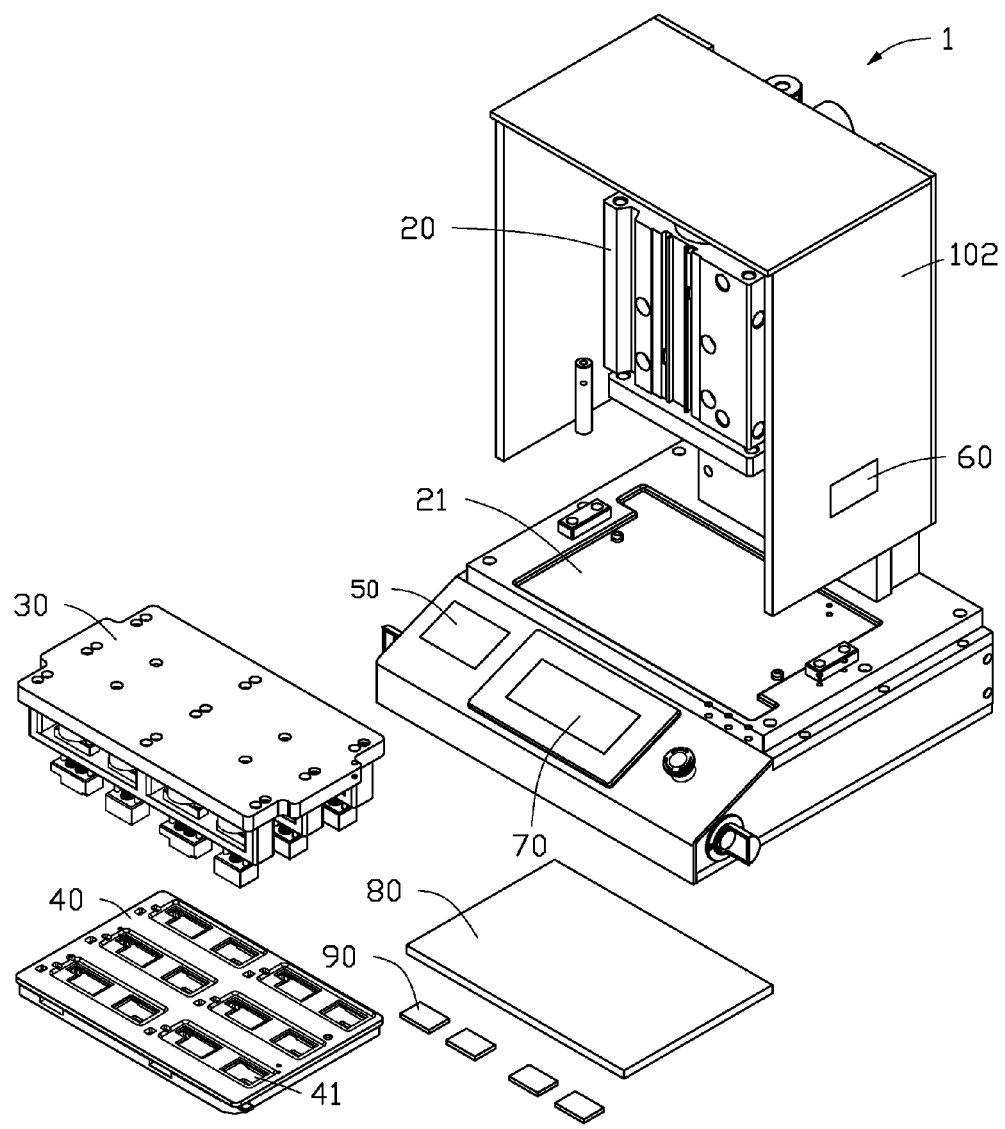
FIG. 2 is an exploded view of the pressure-sensitive cover installer of FIG. 1.

Referring to FIGS. 1-2, an embodiment of a pressure-sensitive cover installer 1 is illustrated. The pressure-sensitive cover installer 1 includes a base 101, a fixing body 2, a support portion fixed on the base 101 via the fixing body 2, an air cylinder 20 movably connected to the support portion 102, a pressure sensing member 30 fixed below the air cylinder 20, a positioning fixture 40 placed on the fixing body 2, a controller 50, a motor 60, and a display 70 mounted on a lateral surface of the base 101. The motor 60 is used to control movement of the air cylinder 20. In another embodiment, the display 70 can be mounted on other places of the base 101 according to need.

The fixing body 2 defines a recessed portion 21 on the top surface thereof. A main body 80 is placed on a bottom of the recessed portion 21. The positioning fixture 40 is placed on the main body 80, thereby fixing the main body 80 within the recessed portion 21. The positioning fixture 40 defines a number of through holes 41 therein. A number of covers 90 sized to be friction fit in the holes 41, are placed in the holes 41. The air cylinder 20 is forced by the motor 60 to drive the pressure sensing member 30 to press the covers 90 until the covers 90 are mounted onto the main body 80.

Figure 3:
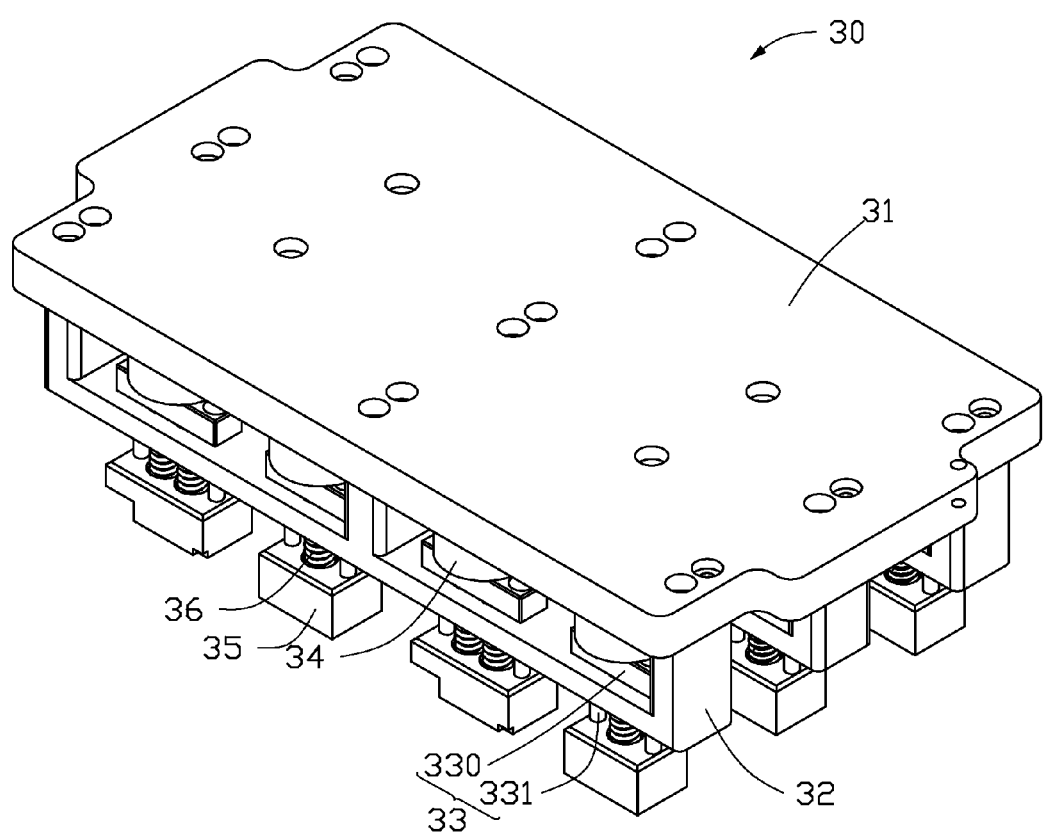
FIG. 3 is an enlarged view of a pressure sensing member of the pressure-sensitive cover installer of FIG. 1.

Referring to FIG. 3, the pressure sensing member 30 includes a fixing plate 31, a support frame 32 fixed below the fixing plate 31, at least one pressure transfer portion 33 connected above the support frame 32, at least one pressure sensor 34 placed between the pressure transfer portion 33 and the fixing plate 31, a number of pressure portions 35 aligned with the holes 41, and a number of an elastic elements 36 connected between the pressure portions 35 and the support frame 32. The fixing plate 31 is fixed to a lower surface of the air cylinder 20, thereby fixing the pressure sensing member 30 to the air cylinder 20. In one embodiment, the elastic element 36 is a spring. The pressure transfer portion 33 includes a pressure transfer block 330 and two extending portions 331 perpendicularly extending from opposite ends of the pressure transfer block 330. The pressure transfer block 330 is placed on the support frame 32, and the two extending portions 331 penetrate the support frame 32, thereby connecting the pressure transfer portion 33 to the support frame 32. In one embodiment, the size of the pressure portion 35 is slightly less than that of the holes 41, in other words the same size as the covers 90. The pressure portion 35 is equal to that of the number of the holes 41. When the air cylinder 20 is forced by the motor 60 to drive the pressure sensing member 30 to move towards the positioning fixture 40, the pressure portions 35 is driven to press the covers 90 onto the main body 80.

Figure 4:
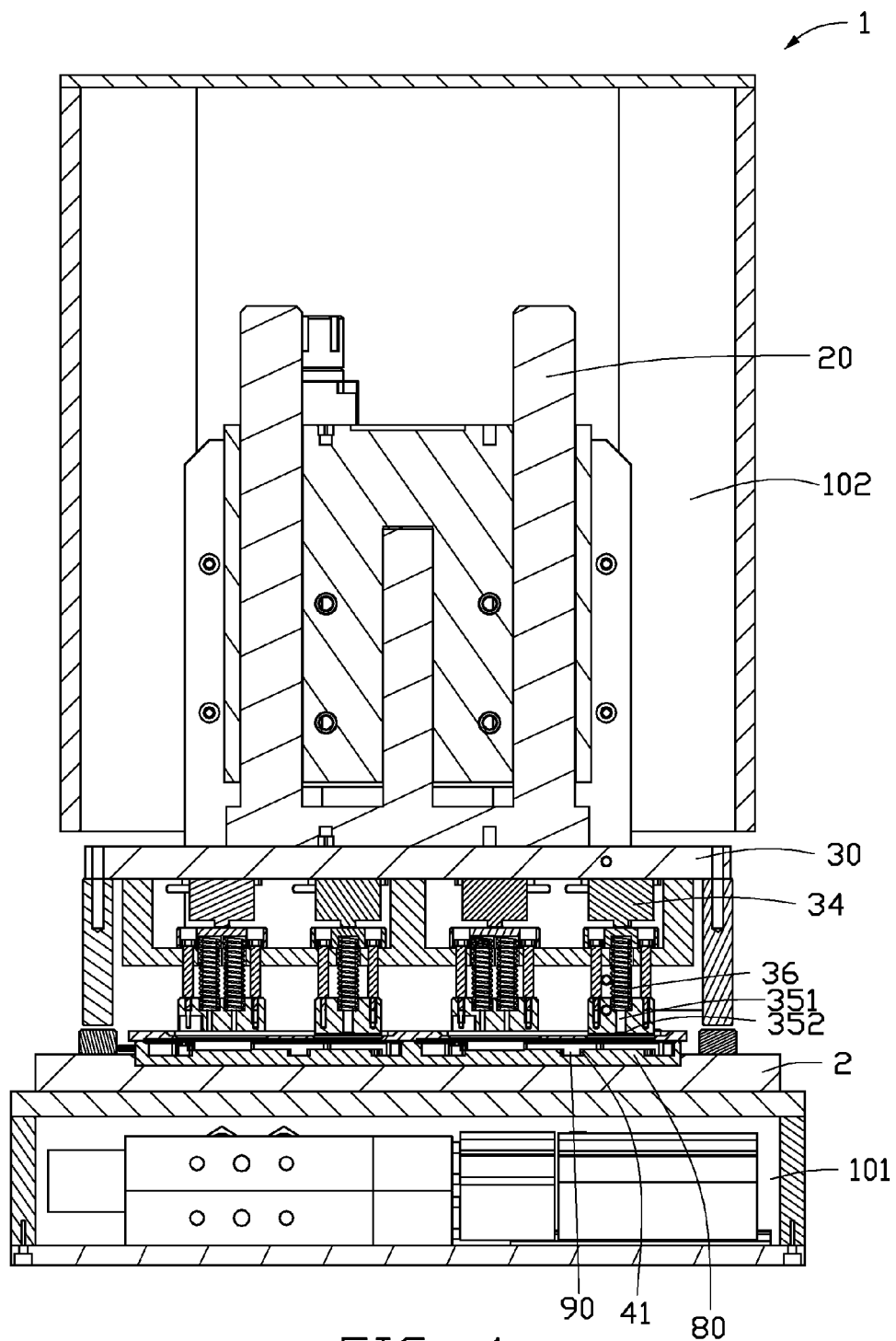
FIG. 4 shows the pressure-sensitive cover installer in a working state.

Referring to FIG. 4, the air cylinder 20 is forced by the motor 60 to drive the pressure sensing member 30 to press the covers 90 until the covers 90 are mounted onto the main body 80. During the process of mounting the covers 90 onto the main body 80, the main body 80 resists the covers 90. The covers 90 transfer pressure of the resistance to the pressure portions 35. The pressure portions 35 transfers the pressure of the resistance to movement of the support frame 32 via the elastic element 36. The support frame 32 transfers the pressure of the resistance to the pressure transfer portion 33. The pressure transfer portion 33 transfers the pressure of the resistance to the pressure sensor 34. The pressure sensor 34 generates a pressure signal to the controller 50 according to the pressure of the resistance. The controller 50 analyzes the pressure signal to generate a pressure value to be displayed on the display 70, for quick analysis by user to determine whether the pressure value exceeds a bearing capacity of the main body 2 during mounting the covers 90 onto the main body 80, so that corrective action may be taken before damage occurs to any of the parts.

In one embodiment, the pressure-sensitive cover installer 1 further includes a number of pistons 351 and washers 352 placed between the pressure portion 35 and the elastic elements 36. The number of pistons 351 and the washers 352 are configured for better transferring the pressure of the resistance from the pressure portions 35 to the elastic elements 36.

Figure 5:
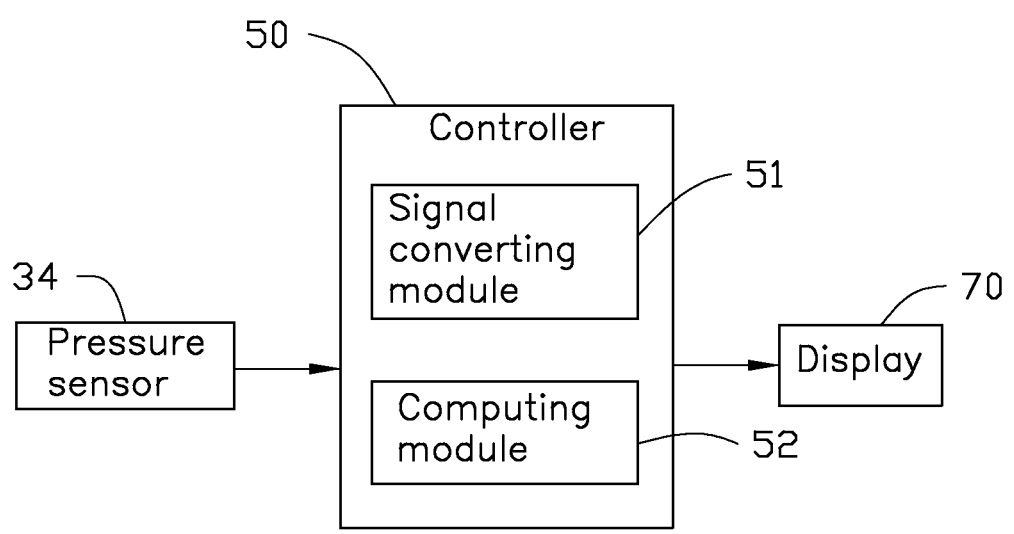
FIG. 5 is a block diagram of a hardware infrastructure of the pressure-sensitive cover installer of FIG. 1.

Referring to FIG. 5, the controller 50 includes a signal converting module 51 and a computing module 52. The signal converting module 51 is configured for converting the pressure signal from the pressure sensor 34 to an electronic signal, and then converting the electronic signal to a digital signal. The computing module 52 is configured for computing the digital signal to generate the pressure value to be displayed on the display 70.

Although the present disclosure has been specifically described on the basis of the exemplary embodiment thereof, the disclosure is not to be construed as being limited thereto. Various changes or modifications may be made to the embodiment without departing from the scope and spirit of the disclosure.

What is claimed is:

1. A pressure-sensitive cover installer comprising:
a base;
a fixing body defining a recessed portion therein;
a main body being received into the recessed portion;
a support portion fixed on the base via the fixing body;
an air cylinder movably connected to the support portion;
a positioning fixture placed on the main body, and defining a plurality of through holes therein for receiving a plurality of covers;
a controller;
a motor for controlling movement of the air cylinder;
a pressure sensing member fixed below the air cylinder, and comprising a fixing plate, a support frame connected below the fixing plate, at least one pressure transfer portion fixed on the support frame, at least one pressure sensor placed between the pressure transfer portion and the fixing plate, a plurality of pressure portions aligned with the holes, and a plurality of elastic elements connected between the pressure portions and the support frame; and a display;

wherein the air cylinder is driven by the motor to drive the pressure sensing member to press the covers until the covers are mounted onto the main body, the main body resists the pressure sensing member to generate a pressure of a resistance, the pressure sensing member senses the pressure of the resistance and generates a pressure signal to the controller according to the pressure of the resistance, and the controller analyzes the pressure signal to generate a pressure value to be displayed on the display.

2. The pressure-sensitive cover installer as described in claim 1, wherein the controller comprises a signal converting module and a computing module, the signal converting module is configured for converting the pressure signal from the at least one pressure sensor to an electronic signal, and then converting the electronic signal to a digital signal, the computing module is configured for computing the digital signal to generate the pressure value to be displayed on the display.

3. The pressure-sensitive cover installer as described in claim 1, wherein the display is mounted on a lateral surface of the base.

4. The pressure-sensitive cover installer as described in claim 1, wherein during mounting the covers onto the main body, the main body resists the pressure portions, the pressure portions transfer the pressure of the resistance to movement of the support frame via the plurality of elastic elements, the support frame transfers the pressure of the resistance to movement of the at least one pressure transfer portion, the at least one pressure transfer portion transfers the pressure of the resistance to the at least one pressure sensor, the at least one pressure sensor generates the pressure signal to the controller according to the pressure of the resistance, and the controller analyzes the pressure signal to generate the pressure value to be displayed on the display.

5. The pressure-sensitive cover installer as described in claim 4, wherein the size of the pressure portion is slightly less than that of the through hole.

6. The pressure-sensitive cover installer as described in claim 4, wherein the pressure portions is equal to that of the number of the through holes.

7. The pressure-sensitive cover installer as described in claim 4, wherein the elastic element is a spring.

8. The pressure-sensitive cover installer as described in claim 4, further comprising a plurality of pistons and washers placed between the pressure portion and the elastic element, wherein the plurality of pistons and washers are configured for better transferring the pressure of the resistance from the pressure portions to the elastic elements when the pressure portions press the covers onto the main body.

9. The pressure-sensitive cover installer as described in claim 4, wherein the at least one pressure transfer portion comprises a pressure transfer block and two extending portions perpendicularly extending from opposite ends of the pressure transfer block, the pressure transfer block is placed on the support frame, and the two extending portions penetrate the support frame, thereby fixing the at least one pressure transfer portion to the support frame.

* * * * *